(12) United States Patent
Huotari

(10) Patent No.: US 6,322,129 B2
(45) Date of Patent: Nov. 27, 2001

(54) COMBINATION OF A LOCKABLE, SOFT TONNEAU COVER AND LOCKABLE TAILGATE

(75) Inventor: Keijo J. Huotari, Fenton, MI (US)

(73) Assignee: Bestop, Inc., Broomfield, CO (US)

( * ) Notice: Subject to any disclaimer, the term of this patent is extended or adjusted under 35 U.S.C. 154(b) by 0 days.

(21) Appl. No.: 09/862,570

(22) Filed: May 21, 2001

Related U.S. Application Data

(63) Continuation of application No. 09/393,905, filed on Sep. 10, 1999, now Pat. No. 6,234,561
(60) Provisional application No. 60/100,039, filed on Sep. 11, 1998, now abandoned.

(51) Int. Cl.$^7$ ........................................................ B60P 7/04
(52) U.S. Cl. .......................... 296/100.15; 296/100.16; 296/100.17
(58) Field of Search ............................... 296/57.1, 100.15, 296/100.16, 100.17, 100.18; 160/368.1; 292/DIG. 5, DIG. 43; 70/158, 163

(56) References Cited

U.S. PATENT DOCUMENTS

| | | | |
|---|---|---|---|
| Re. 33,790 | * 1/1992 | Huber | 296/100 |
| 559,019 | 4/1896 | Zugermayer | 160/26 |
| 1,026,864 | 5/1912 | Hiney | 160/25 |
| 2,771,319 | 11/1956 | Renquist | 296/100.09 |
| 4,036,521 | 7/1977 | Clenet | 296/100 |
| 4,273,377 | * 6/1981 | Alexander | 296/100 |
| 4,547,014 | 10/1985 | Wicker | 296/100.12 |
| 4,600,235 | 7/1986 | Frederick et al. | 296/106 |
| 4,743,058 | * 5/1988 | Fedrigo | 296/1 S |
| 4,757,854 | 7/1988 | Rippberger | 160/391 |
| 4,807,921 | 2/1989 | Champie, III et al. | 296/98 |
| 4,838,602 | 6/1989 | Nett | 296/100 |
| 4,877,283 | 10/1989 | Little et al. | 296/100 |
| 5,076,338 | 12/1991 | Schmeichel et al. | 160/368.1 |
| 5,104,171 | * 4/1992 | Johnsen et al. | 296/50 |
| 5,174,353 | 12/1992 | Schmeichel et al. | 160/368 |
| 5,251,951 | 10/1993 | Wheatley | 296/100.15 |
| 5,257,850 | 11/1993 | Brim | 296/39.2 |
| 5,301,995 | 4/1994 | Isler | 296/100 |
| 5,460,423 | 10/1995 | Kersting et al. | 296/100 |
| 5,472,256 | 12/1995 | Tucker | 296/100 |
| 5,480,206 | 1/1996 | Hathaway et al. | 296/36 |
| 5,487,585 | 1/1996 | Wheatley | 296/100 |
| 5,511,843 | 4/1996 | Isler et al. | 296/100 |
| 5,553,652 | 9/1996 | Rushford | 160/354 |
| 5,655,807 | 8/1997 | Rosario | 296/98 |
| 5,687,895 | 11/1997 | Allison et al. | 224/542 |
| 5,702,147 | 12/1997 | Essig | 296/106 |
| 5,765,903 | 6/1998 | Essig et al. | 296/102 |
| 5,857,729 | * 1/1999 | Bogard | 296/100.09 |
| 5,984,400 | * 11/1999 | Iller et al. | 296/100.15 |
| 6,076,881 | 6/2000 | Tucker | 296/100.7 |
| 6,078,881 | * 6/2000 | Tucker | 296/100.07 |

* cited by examiner

Primary Examiner—Joseph D. Pape
Assistant Examiner—Paul Chenevert
(74) Attorney, Agent, or Firm—W. Scott Carson

(57) ABSTRACT

The combination of a lockable, soft, flexible tonneau cover for the bed of a pickup truck or similar vehicle and a lockable tailgate. The preferred embodiment includes grooved front, side, and rear rails into which retainer belts on the perimeter of the tonneau cover are insertable to position the cover over the vehicle bed. The front and side rails are respectively attached to the tops of the front and side walls of the bed. The rear rail is mounted to extend and be suspended across the tailgate opening between the side rails. A catch is provided to selectively lock the rear rail in place and keep the rear rail and attached cover in the locked, down position over the bed. In the preferred embodiment, the catch for the rear rail is only accessible through the tailgate opening and the tailgate is lockable to the side walls of the bed.

21 Claims, 5 Drawing Sheets

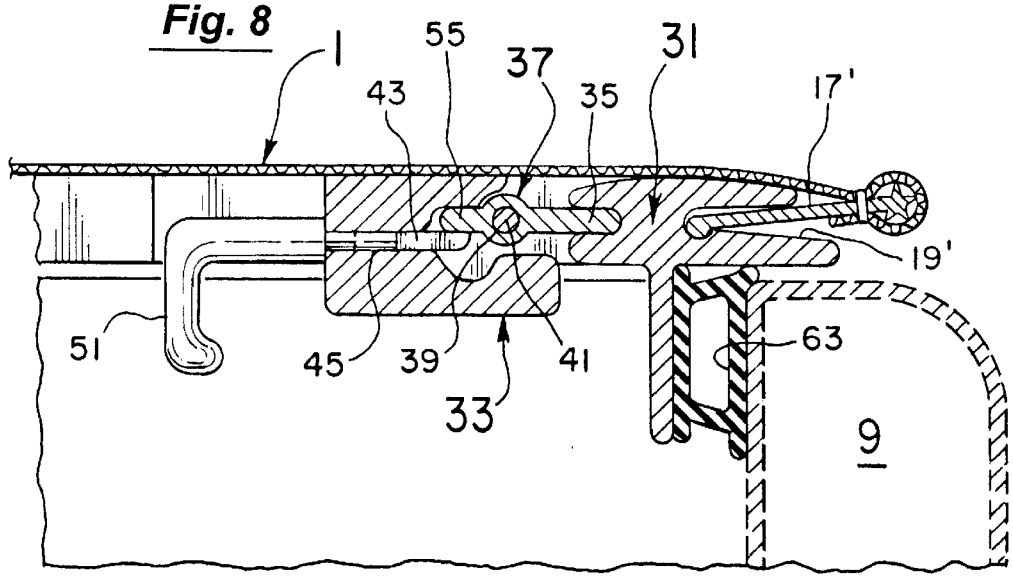
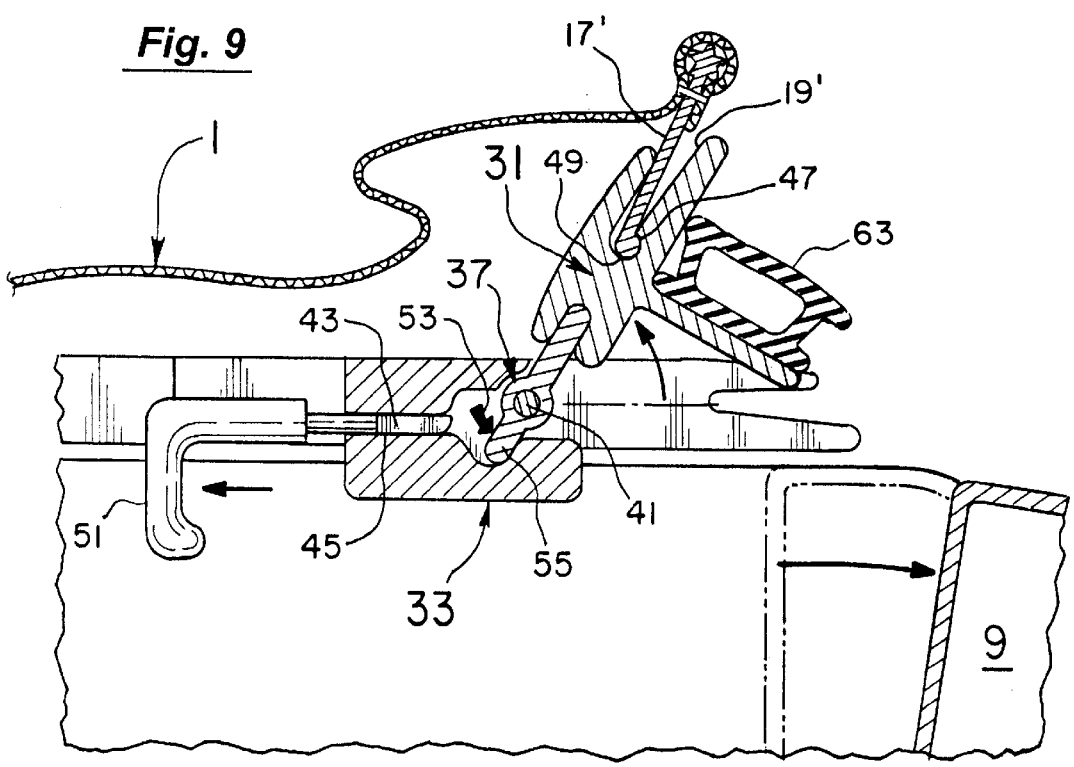

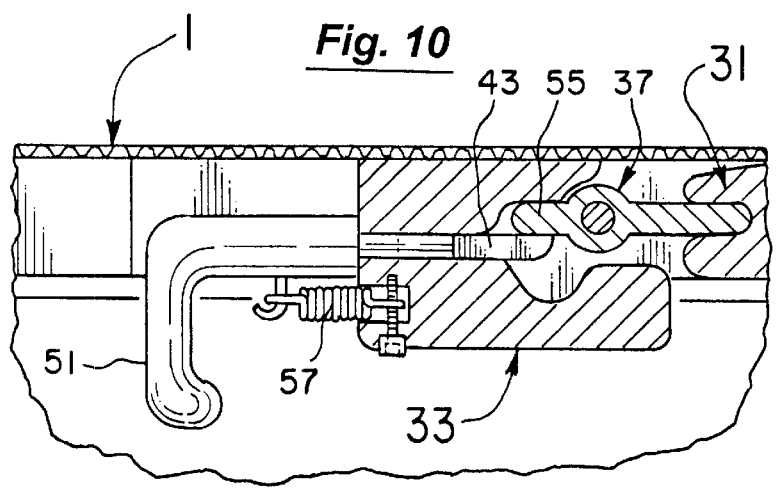
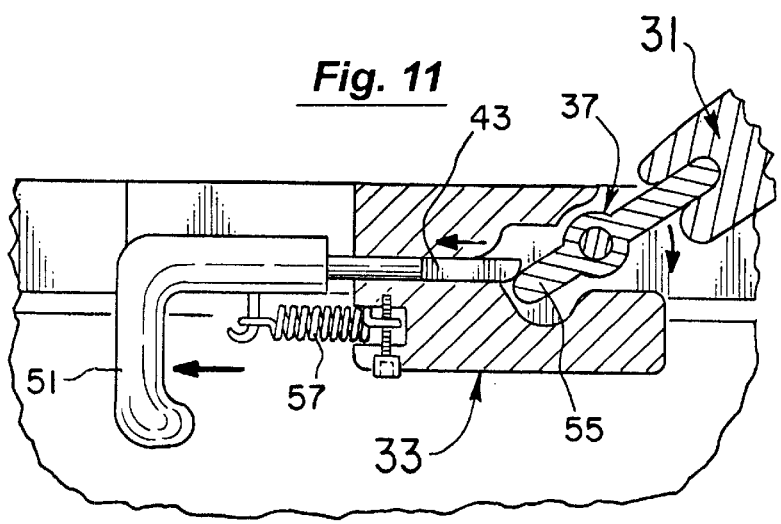
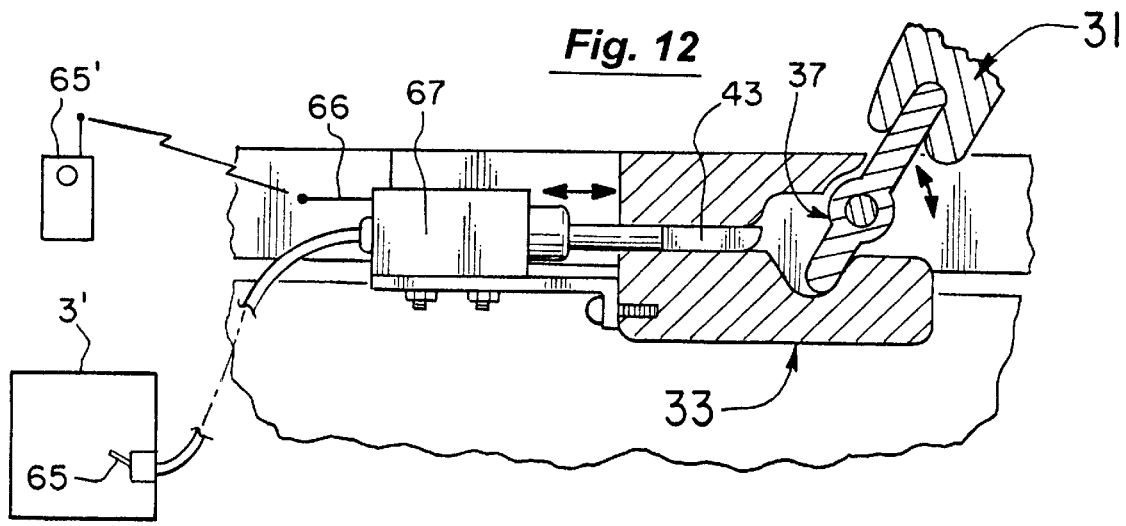

COMBINATION OF A LOCKABLE, SOFT TONNEAU COVER AND LOCKABLE TAILGATE

RELATED APPLICATIONS

This application is a continuation of U.S. patent application Ser. No. 09/393,905 filed Sep. 10, 1999, now U.S. Pat. No. 6,234,561, which claims the benefit of U.S. Provisional Patent Application Ser. No. 60/100,039 filed Sep. 11, 1998, now abandoned.

BACKGROUND OF THE INVENTION

1. Field of the Invention. This invention relates to the field of soft, tonneau covers and more particularly to the field of soft, tonneau covers for the beds of pickup trucks and similar vehicles.

2. Discussion of the Background. Soft, tonneau covers for pickup trucks and similar vehicles (such as sport utility ones with exposed beds or decks) help to cover and protect the beds of the vehicles and any items in them. Such covers typically are made of flexible fabric, canvas, or vinyl. Additionally, they commonly have a relatively low profile (i.e., extend relatively flat across the top of the bed walls) and can be easily moved to cover and uncover the bed and its contents. They are also often easily and conveniently storable on the vehicle when not in use or easily removed completely from the vehicle for separate storage.

Currently, such soft covers are normally not lockable and can be removed by anyone at any time from over the bed of the vehicle. Some covers like U.S. Pat. No. 5,076,338 to Schmeichel et al. secure the soft cover in place over the bed with nominal locking arrangements but do not do so in combination with a lockable tailgate to create true security.

With this in mind, the lockable tonneau cover and lockable tailgate combination of the present invention was developed.

SUMMARY OF THE INVENTION

This invention involves a lockable, soft, flexible tonneau cover for the bed of a pickup truck or similar vehicle wherein the lockable tonneau cover is used in combination with a lockable tailgate for increased security. The preferred embodiment includes grooved front, side, and rear rails into which retainer belts on the perimeter of the tonneau cover are insertable to position the cover over the vehicle bed. The front and side rails are respectively attached to the tops of the front and side walls of the bed. The rear rail is mounted to extend and be suspended across the tailgate opening between the side rails.

The mounting for the rear rail includes corner pieces on each side wall of the bed to which the rear rail is pivotally mounted for movement between up and down positions. In the up position, the retainer belt on the rear edge of the untensioned cover can be easily inserted into the groove in the rear rail. Thereafter, the rear rail can be manually rotated or pushed down to its closed position to tension or tighten the cover and move it completely over the vehicle bed. A catch is provided to selectively lock the rear rail in place and keep the rear rail and attached cover in the locked, down position over the bed.

The catch for the rear rail is only accessible through the rear, tailgate opening and the combination of the present invention also includes a tailgate that is lockable. Consequently, to unlock and remove the tonneau cover to expose the bed and its contents, the tailgate must first be unlocked and opened to provide access to the catch for the rear rail. In this manner, increased security is provided by the combination of the lockable tonneau cover and lockable tailgate of the present invention.

In another embodiment, the lock for the rear rail is remotely controlled by an electronic actuator in an equally secure manner.

BRIEF DESCRIPTION OF THE DRAWINGS

FIG. 8 is a cross-sectional view taken along line 8—8 of FIG. 1 and generally along line 8—8 of FIGS. 6 and 7 showing the rear rail and cover in their closed or down position. FIG. 8 also shows the tailgate in dotted lines in its closed position.

FIG. 9 is a view similar to FIG. 8 illustrating the rear rail and cover in their up or open position. FIG. 9 also illustrates the tailgate being moved to an open position.

FIG. 10 is a cross-sectional view similar to FIG. 8 showing a modified locking arrangement for the rear rail and attached cover in which the catch for the rear rail is spring-biased toward its locking position.

FIG. 11 illustrates how the downward movement of the rear rail and attached flipper member toward the closed, locked position can be used to cam the catch of the locking arrangement out of the way to let the flipper member pass by it to the position of FIG. 10.

FIG. 12 is a view similar to FIG. 10 illustrating a modified locking arrangement in which the catch is electronically controlled by a solenoid remotely actuated from the vehicle cabin or from a portable actuator.

DETAILED DESCRIPTION OF THE INVENTION

Figure 1:
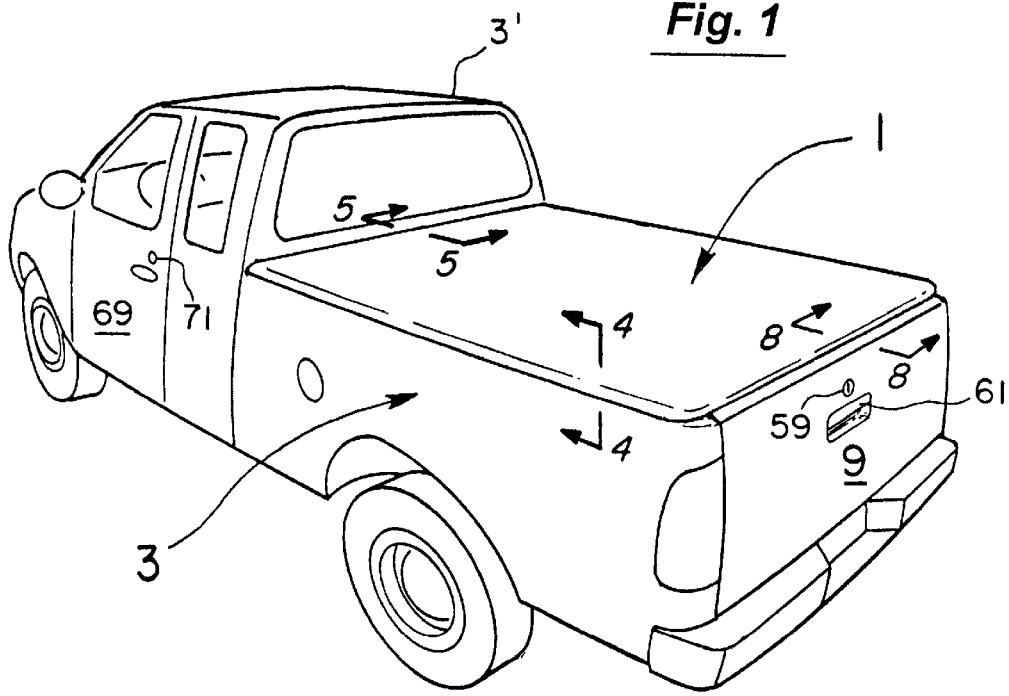
FIG. 1 is a perspective view of the combination of the present invention of a lockable, soft tonneau cover and lockable tailgate. The soft, tonneau cover in FIG. 1 is shown in use covering the bed of a pickup truck.
Figure 2:
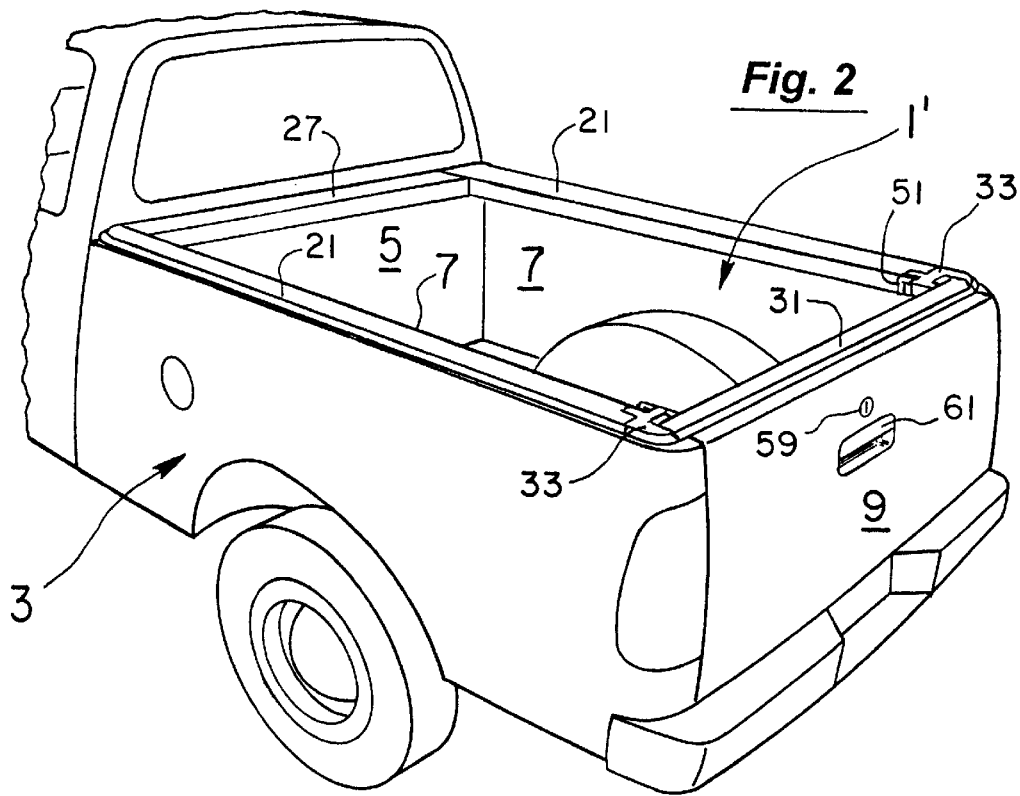
FIG. 2 is a view similar to FIG. 1 with the soft, tonneau cover removed and the tailgate in its closed position.

FIG. 1 shows the soft, flexible tonneau cover 1 of the present invention in the closed or down and locked position over the bed of the vehicle 3 (e.g., pickup truck). The bed as best seen in FIG. 2 is formed and defined by front wall 5, side walls 7, and the tailgate 9 in the closed position of FIG. 2. The tailgate 9 is shown as being mounted for pivotal movement about horizontal axis 11 in FIG. 3 but could also be conventionally mounted for pivotal movement about a vertical axis. The tailgate 9 as illustrated can be manually moved between the closed and open positions of FIGS. 2 and 3. In the open position of FIG. 3, rear access to the bed is provided through the tailgate opening 9' between the side walls 7. In the closed position of FIG. 2, the tailgate 9, front wall 5, and side walls 7 then form and define an upper opening 1' to the bed of the vehicle 3. The closed tailgate 9 in this regard serves to form the fourth wall of the bed with the front and side walls 5 and 7 forming the other three walls of the bed.

The tonneau cover 1 of FIG. 1 is preferably made of a single, continuous sheet or piece of flexible material (e.g., fabric, canvas, or vinyl) that is slightly elastic and stretchable. In use (and in the known manners of co-owned U.S. Pat. Nos. 4,757,854; 5,702,147; and 5,765,903), relatively rigid belts 17 as in FIG. 4 can be attached (e.g., sewn) to the edges of the substantially rectangular cover 1 and removably received or attached in grooves or channels like 19 in side rail 21 (see FIG. 4). If desired, a P-welt or arrangement of a dowel 23 and C-shaped channel 25 (see FIG. 5) could be used as for example with the front rail 27.

Figure 3:
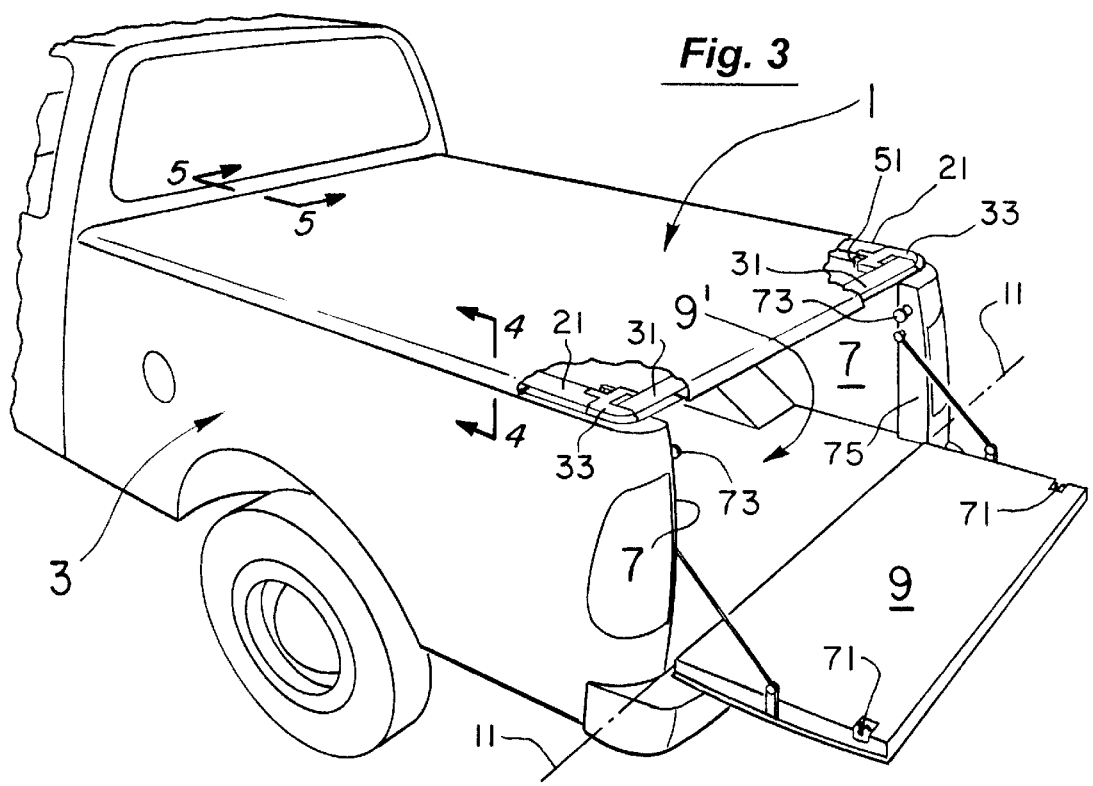
FIG. 3 shows the soft, tonneau cover of the present invention in its down, locked position covering the bed and the tailgate in its open position.
Figure 4:
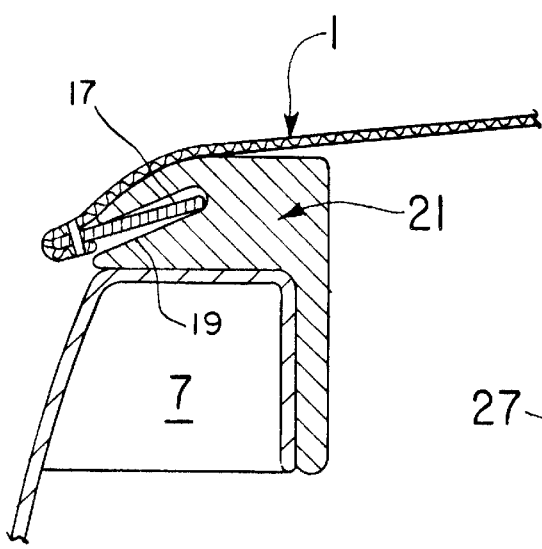
FIG. 4 is a view taken along line 4—4 of FIGS. 1 and 3 illustrating how the cover can be attached to the side rails on the side walls of the vehicle bed.
Figure 5:
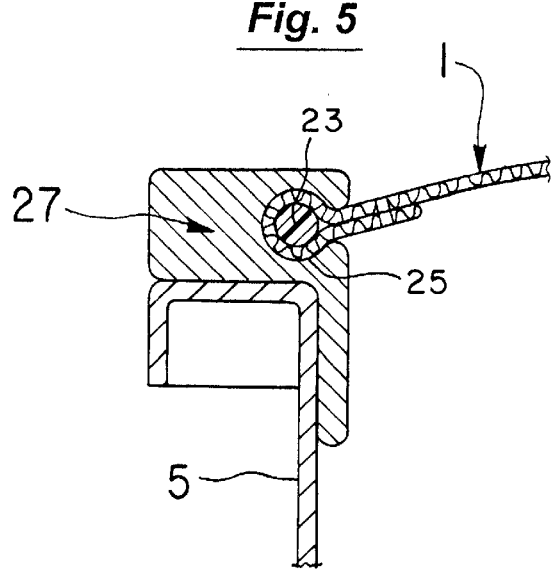
FIG. 5 is a view taken along line 5—5 of FIGS. 1 and 3 illustrating how the cover can be attached to the front rail on the front wall of the vehicle bed.
Figure 6:
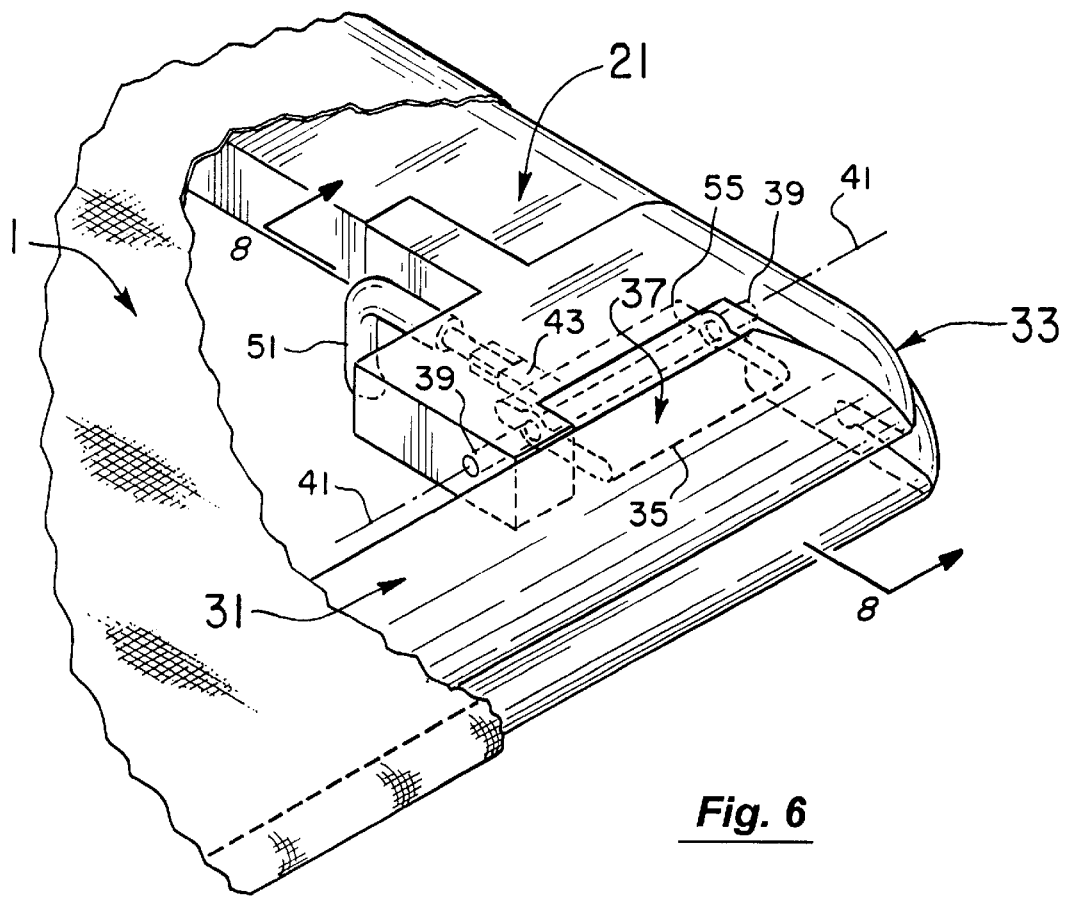
FIG. 6 is a perspective view of one of the corner pieces to which the rear rail and cover are pivotally mounted.
Figure 7:
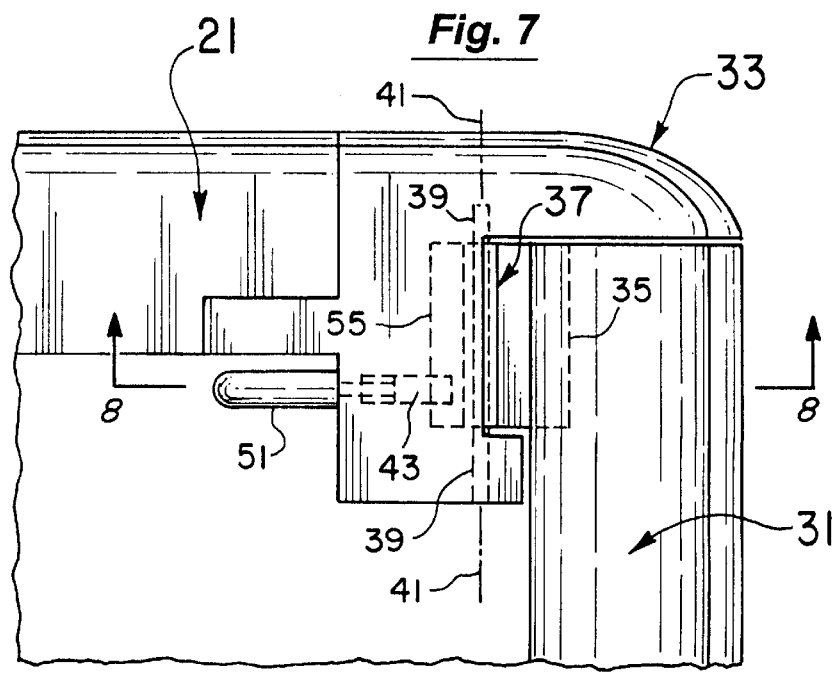
FIG. 7 is a top plan view of FIG. 6 further illustrating how the rear rail is pivotally mounted to each corner piece.

The front and side rails 27 and 21 in FIGS. 2, 4, and 5 are attached or mounted to the tops of the front and side walls 5 and 7 of the vehicle 3. The rails 27 and 21 could also be molded into the walls 5 and 7 if desired. The rear rail 31 as best seen in FIG. 3 is mounted to extend and be suspended across the tailgate opening 9' between the two side walls 7. The mounting for the rear rail 31 includes corner pieces 33 (see FIG. 3) on each side of the bed to which the rear rail 31 is pivotally mounted. More specifically as illustrated in FIGS. 6–8, each end of the rear rail 31 (see FIG. 8) is mounted on a rear end section 35 of a flipper member 37. The flipper member 37 in turn is mounted by pin member 39 to the corner piece 33 (see also FIGS. 6 and 7) for pivotal movement about the axis 41 relative to the corner piece 33 and the side walls 7. In the down, locked position of FIG. 8, the catch 43 is extended to keep the rear rail 31 and attached tonneau cover 1 in this down or closed position fully covering the bed of vehicle 3 as in FIG. 1).

In operation as best seen in FIGS. 8 and 9, the catch 43 is slidably mounted or supported for movement within the channel 45 of each corner piece 33 between the extended, locking position of FIG. 8 and the retracted, non-locking position of FIG. 9. The retaining belt 17' on the rear edge of the cover 1 is preferably first inserted into the groove or channel 19' of the rear rail 31 with the rear rail 31 in the first or up position of FIG. 9. The belt 17' as best seen in FIG. 9 is preferably one with a detent or protuberance 47 receivable in the mating recess 49 of the channel 19' (e.g., in the known manner of co-owned U.S. Pat. No. 5,765,903). In this raised position of FIG. 9, the rear rail 31 is closer to the front wall 5 than in the down, locked position of FIG. 8 and the tonneau cover 1 is somewhat slack and loose. The belt 17' can then be fairly easily manipulated into the channel 19' of the rear rail 31. Thereafter, the rear rail 31 can be manually pivoted downwardly and away from the front wall 5 from the position of FIG. 9 to the position of FIG. 8. This positions the cover 1 fully over the upper opening 1' to the bed (see FIG. 1). It also draws the cover 1 taut and the rear belt 17' and side belts 17 tightly into the respective grooves 19' and 19 in the rear rail 31 and side rails 21 of FIGS. 4 and 8. In doing so, the cover 1 is slightly stretched both from front-to-rear and side-to-side. Preferably, the residual tension in the stretched cover 1 (both front-to-rear and side-to-side) will make it very difficult if not impossible to remove the belts 17' and 17 from the respective rails 31 and 21.

When the cover 1 is in the closed position, the catch 43 as illustrated in FIG. 3 is only accessible through the tailgate opening 9'. Consequently, when the tailgate 9 is in the up or closed position of FIGS. 1, 6, and 8, the catch 43 within the vehicle bed beneath the cover 1 cannot be reached and access to the catch 43 is prevented. To then unlock the cover 1 to expose the bed and its contents, the tailgate 9 must first be opened as in FIG. 3. Since the tailgate 9 is also lockable (e.g., as by key lock 59 for latch 61 in FIG. 1, which latch 61 in a known and conventional manner allows the catches 71 on the tailgate 9 as shown in FIG. 3 to be selectively released from locking engagement with the pins 73 on the respective rear portions 75 of the side walls 7 forming the sides of the tailgate opening 9'), the combination of the lockable cover 1 and lockable tailgate 9 of the present invention serves to offer increased security to the vehicle owner.

In the preferred embodiments and with the rear rail 31 and attached cover 1 in the down and locked position of FIG. 8, the closed tailgate 9 (shown n dotted lines in FIG. 8) will abut the sealing member 63 on the rear rail 31. The elongated, sealing member 63 could be on either the rear rail 31 or the tailgate 9 but in either case, a substantially watertight seal is created when the tailgate 9 is closed against the rear rail 31. Additionally, as best seen in FIGS. 1 and 3, the tailgate 9 can be opened and closed without having to undo the cover 1 or move the rear rail 31 from the down and locked position. In this regard, the tonneau cover 1 of the present invention can remain in the down and locked position and does not need to be manipulated in any manner to open the tailgate 9 to provide access through the tailgate opening 9' of FIG. 3 to the bed and its contents. This is true whether the tailgate 9 is mounted for pivotal movement about a horizontal axis 11 as shown in FIG. 3 or mounted for rotation about a vertical axis.

While several embodiments of the present invention have been shown and described in detail, it is to be understood that various changes and modifications could be made without departing from the scope of the invention. For example, the rear rail 31 is shown and described as being mounted for pivotal or rotational movement about the axis 41 relative to the corner pieces 33 and side walls 7. However, the rear rail 31 could be mounted to slide horizontally relative to the corner pieces 33 if desired to draw the cover 1 taut over the vehicle bed. Further, the catch 43 could also be electronically and/or remotely controlled (e.g., mechanically or electronically) if desired to move between its extended and retracted positions. In this regard, for example, an electronic actuator or switch 65 could be remotely provided in the vehicle cabin 3' as schematically illustrated in FIG. 12 to selectively control the solenoid 67 to extend and retract the catch 43. Since the cabin doors 69 in FIG. 1 are also lockable at 71 and the solenoid 67 and catch 43 are inaccessible with the tailgate 9 up and locked in the manner of FIG. 8, this remotely controlled arrangement from the cabin 3' provides an equally secure system. The solenoid 67 in FIG. 12 could also be remotely controlled by radio or other electromagnetic waves received by the antenna 66 from a generating source such as actuator 65' that was, for example, in the cabin 3' or part of a handheld, portable unit carried by the vehicle owner. In the preferred embodiments including the remotely controlled ones, the tension in the stretched and closed cover 1 will cause the rear rail 31 and attached cover 1 to conveniently pop up toward its open position when the catch 43 is released. The portable actuator 65' (e.g., radio frequency) could also remotely control the locks 59 and 71 for the tailgate 9 and vehicle doors 69 if desired.

I claim:

1. A combination of a lockable, soft, flexible tonneau cover for a bed of a vehicle and a lockable tailgate wherein:
said bed of said vehicle has a front wall and two side walls forming three walls of the bed with said tailgate forming a fourth wall of the bed, said tailgate being pivotally mounted for movement about an axis between open and closed positions, said tailgate in said open position providing rear access to the bed through a tailgate opening extending between and defined in part by said side walls, said tailgate in said closed position forming the fourth wall of the bed and preventing rear access to the bed through said tailgate opening, said tailgate being selectively lockable in said closed position to at least one of the side walls of the bed by a lock for said tailgate, said tailgate in said closed position defining with said front and side walls an upper opening to the bed of the vehicle, and, said soft, flexible tonneau cover being positioned in a closed position to cover said upper opening to the bed of the vehicle and prevent access through said upper opening, said tonneau cover being selectively lockable in said closed position over said bed by a lock for said tonneau cover wherein access to said lock for said tonneau cover is prevented when said tonneau cover and said tailgate are respectively in said closed positions.

2. The combination of claim 1 wherein said cover is positionable in said closed position to cover said upper opening to the bed of the vehicle and prevent access through said upper opening by rails attached respectively atop said front and two side walls said cover being removably attached to said rails attached atop said front and two side walls.

3. The combination of claim 1 wherein said tonneau cover is made of slightly elastic and stretchable material.

4. The combination of claim 1 wherein said tailgate is selectively lockable in said closed position to both of the side walls of the bed.

5. The combination of claim 1 wherein said tonneau cover is positionable in an open position permitting access through said upper opening to the bed of the vehicle and said tailgate is lockable with said lock for said tailgate in said closed position when said tonneau cover is in said open position;

In the closed, down position of the rear rail 31 and with the tailgate 9 open as in FIG. 3, the handle 51 of the catch 43 can then be manually reached through the tailgate opening 9' and slid rearwardly in the supporting channel 45 (see FIG. 8) to the extended, locked position. This keeps the rear rail 31 in the down position of FIG. 8 and prevents the rear rail 31 from moving out of the down position of FIG. 8 relative to the corner pieces 33 and side walls 7. In doing so, the catch 43 is extended into what would be the normal, pivotal path 53 (see FIG. 9) of the end section 55 of the flipper member 37 between the positions of FIGS. 8 and 9. The flipper front end section 55 in this regard and as illustrated is spaced from the pivotal axis 41;

If desired as shown in FIG. 10, the catch 43 could be spring-biased at 57 toward the extended, locking position of FIG. 10. In this manner, the front end section 55 of the flipper member 37 (see FIG. 11) could then cam the extended catch 43 out of the way as the front end section 55 passes by the extended, biased catch 43 This would occur when the flipper member 37 and attached rear rail 31 were moved from the up position (see FIG. 11) to the down position of FIG. 10. The same camming action would also occur if the unbiased catch 43 of FIG. 9 were inadvertently extended into the predetermined path 53 of the end section 55 when the rear rail 31 was being lowered from FIG. 9 to FIG. 8.

6. The combination of claim 1 wherein said lock for said tonneau cover is positioned within the bed of said vehicle wherein the lock for said tailgate must be unlocked and the tailgate moved to said open position to provide access to the lock for said tonneau cover.

7. The combination of claim 6 wherein the lock for the tonneau cover is positioned beneath said tonneau cover when said tonneau cover is in said closed position.

8. The combination of claim 1 further including a rear rail mounted to extend substantially between said two side walls of the bed, said tonneau cover being attached to said rear rail, said rear rail further being mounted for movement relative to said two side walls toward and away from said front wall between at least first and second positions, said rear rail in said second position being farther away from the front wall than in said first position, said rear rail in said second position extending substantially horizontally between the two side walls across the tailgate opening, said tonneau cover being in said closed position when said attached rear rail is moved to said second position.

9. The combination of claim 8 wherein said tonneau cover is made of one piece of material extending over said bed between said side walls and between said front wall and said rear rail when said rear rail is in said second position.

10. The combination of claim 8 wherein said tailgate is movable between said open and closed positions with said rear rail in said second position and said cover attached thereto.

11. The combination of claim 8 wherein said rear rail is releasably lockable in said second position to at least one of said side walls.

12. The combination of claim 8 wherein said tonneau cover is removably attached to said rear rail.

13. The combination of claim 12 wherein said tonneau cover is removably attached to said two side walls.

14. The combination of claim 8 wherein at least one of said rear rail and said tailgate includes a sealing member and the other of said rear rail and said tailgate abuts said sealing member when said rear rail is in said second position and said tailgate is in said closed position.

15. The combination of claim 14 wherein said rear rail includes said sealing member.

16. The combination of claim 8 wherein said rear rail is selectively kept in said second position.

17. The combination of claim 16 wherein said rear rail is mounted for pivotal movement about an axis between said first and second positions wherein an end section of said real rail is spaced from said pivotal axis, said end section moving along a predetermined path about the pivotal axis as said rear rail is pivotally moved between said first and second positions, said rear rail being kept in said second position by a catch selectively movable into and away from said predetermined path to prevent said rear rail from being moved from said second position to said first position.

18. The combination of claim 17 wherein said pivotal axis is substantially horizontal.

19. The combination of claim 16 wherein a catch is selectively supported to prevent said rear rail from moving from said second position to said first position.

20. The combination of claim 19 wherein said catch is supported for sliding movement between respective positions preventing and permitting said rear rail to be moved from said second position to said first position.

21. The combination of claim 20 wherein said catch is biased toward said preventing position.

* * * * *

UNITED STATES PATENT AND TRADEMARK OFFICE
CERTIFICATE OF CORRECTION

PATENT NO. : 6,322,129 B2
DATED : November 27, 2001
INVENTOR(S) : Keijo J. Huotari It is certified that error appears in the above-identified patent and that said Letters Patent is hereby corrected as shown below:

Column 3,
Line 63, before "When", the following two paragraphs are inserted:

-- In the closed, down position of the rear rail 31 and with the tailgate 9 open as in Figure 3, the handle 51 of the catch 43 can then be manually reached through the tailgate opening 9' and slid rearwardly in the supporting channel 45 (see Figure 8) to the extended, locked position. This keeps the rear rail 31 in the down position of Figure 8 and prevents the rear rail 31 from moving out of the down position of Figure 8 relative to the corner pieces 33 and side walls 7. In doing so, the catch 43 is extended into what would be the normal, pivotal path 53 (see Figure 9) of the end section 55 of the flipper member 37 between the positions of Figures 8 and 9. The flipper front end section 55 in this regard and as illustrated is spaced from the pivotal axis 41.

If desired as shown in Figure 10, the catch 43 could be spring-biased at 57 toward the extended, locking position of Figure 10. In this manner, the front end section 55 of the flipper member 37 (see Figure 11) could then cam the extended catch 43 out of the way as the front end section 55 passes by the extended, biased catch 43. This would occur when the flipper member 37 and attached rear rail 31 were moved from the up position (see Figure 11) to the down position of Figure 10. The same camming action would also occur if the unbiased catch 43 of Figure 9 were inadvertently extended into the predetermined path 53 of the end section 55 when the rear rail 31 was being lowered from Figure 9 to Figure 8. --

UNITED STATES PATENT AND TRADEMARK OFFICE
CERTIFICATE OF CORRECTION

PATENT NO.      : 6,322,129 B2
DATED           : November 27, 2001
INVENTOR(S)     : Keijo J. Huotari It is certified that error appears in the above-identified patent and that said Letters Patent is hereby corrected as shown below:

<u>Column 5,</u>
Line 39, is corrected to read:
-- position when said tonneau cover is in said open position. --
Lines 40-66, are deleted.

Signed and Sealed this

Ninth Day of July, 2002

Attest:

Attesting Officer

JAMES E. ROGAN
*Director of the United States Patent and Trademark Office*